(12) United States Patent
Sirbu

(10) Patent No.: US 9,567,034 B2
(45) Date of Patent: Feb. 14, 2017

(54) FOLDABLE AND PORTABLE ELECTRIC VEHICLE

(71) Applicant: NEXTROM INDUSTRIES SRL, Ghercesti, Judet Dolj (RO)

(72) Inventor: Sorin Sirbu, Craiova (RO)

(73) Assignee: NEXTROM INDUSTRIES SRL (RO)

( * ) Notice: Subject to any disclaimer, the term of this patent is extended or adjusted under 35 U.S.C. 154(b) by 0 days.

(21) Appl. No.: 14/750,387

(22) Filed: Jun. 25, 2015

(65) Prior Publication Data
US 2016/0009332 A1  Jan. 14, 2016

(30) Foreign Application Priority Data
Jul. 14, 2014  (RO) .................................. 2014 00538

(51) Int. Cl.
| | | |
|---|---|---|
| *B62K 15/00* | (2006.01) | |
| *B62K 21/12* | (2006.01) | |
| *B62K 11/14* | (2006.01) | |
| *B62L 3/04* | (2006.01) | |
| *B62L 3/02* | (2006.01) | |
| *B62M 6/45* | (2010.01) | |
| *B62M 6/65* | (2010.01) | |
| *B62K 25/00* | (2006.01) | |
| *B62K 21/16* | (2006.01) | |
| *B62L 1/06* | (2006.01) | |

(52) U.S. Cl.
CPC ................. *B62L 3/04* (2013.01); *B62K 11/14* (2013.01); *B62K 15/006* (2013.01); *B62K 15/008* (2013.01); *B62K 21/12* (2013.01); *B62L 3/02* (2013.01); *B62M 6/45* (2013.01); *B62M 6/65* (2013.01); *B60Y 2200/126* (2013.01); *B62K 21/16* (2013.01); *B62K 25/005* (2013.01); *B62K 2202/00* (2013.01); *B62L 1/06* (2013.01); *Y10T 74/20792* (2015.01)

(58) Field of Classification Search
CPC ..... B62K 15/00; B62K 15/006; B62K 15/008; B62K 2202/00; B62K 21/12; B62K 11/14; Y10T 74/20792; B60Y 2200/126
USPC ............. 180/208, 220; 280/87.05, 278, 287; 74/551.3
See application file for complete search history.

(56) References Cited

U.S. PATENT DOCUMENTS

| | | | | |
|---|---|---|---|---|
| 4,087,106 A * | 5/1978 | Winchell | ................ | B62B 13/12 180/183 |
| 6,378,642 B1 * | 4/2002 | Sutton | .................... | B62D 61/08 180/208 |
| 6,478,104 B1 * | 11/2002 | Kemper | ............... | B62D 51/001 180/211 |
| 8,167,074 B1 * | 5/2012 | Tsiyoni | ................... | B60T 11/04 180/208 |
| 9,073,594 B2 * | 7/2015 | Sluijter | .................. | B62K 11/10 |
| 9,205,890 B2 * | 12/2015 | Schreuder | ............. | B62K 3/002 |
| 2012/0193160 A1 * | 8/2012 | Wu | ........................ | B62K 5/007 180/208 |

(Continued)

*Primary Examiner* — Keith Frisby
(74) *Attorney, Agent, or Firm* — Hershkovitz & Associates, PLLC; Abe Hershkovitz

(57) ABSTRACT

A foldable and portable electric vehicle for the transport of a single person comprises a foldable chassis with a support plate, a folding system for folding the chassis, a front driving wheel, a rear wheel, a foldable handlebar, an integrated system of command, control, monitoring and signaling, a mechanical brake on the rear wheel, a suspension on the rear wheel and a suspension on the front wheel, and a steering column.

13 Claims, 6 Drawing Sheets

(56) References Cited

U.S. PATENT DOCUMENTS

2012/0319373 A1\* 12/2012 Landau ................. B62K 15/00
                                                280/87.041
2013/0167684 A1\* 7/2013 Wang .................. B62K 15/008
                                                74/551.4
2015/0158543 A1\* 6/2015 Neto ..................... B62K 15/00
                                                180/208

\* cited by examiner

FOLDABLE AND PORTABLE ELECTRIC VEHICLE

CROSS-REFERENCE TO RELATED APPLICATIONS

The present Application claims priority under 35 U.S.C. §119 of Romanian Patent Application No. RO a 2014 00538, filed on Jul. 14, 2014, the disclosure of which is expressly incorporated herein by reference in its entirety.

BACKGROUND OF THE INVENTION

1. Field of the Invention

The present invention is directed to a foldable and portable electric vehicle for transporting a person that includes an integrated system of command, control, monitoring and signaling.

2. Discussion of Background Information

There are known electric vehicles for the transport of a single person. A known solution in the background of the invention is shown in WO 2014/055566 A1. This PCT Publication discloses an electric vehicle with detachable handlebars.

Existing electric vehicles such as the device shown in the noted PCT Publication have many inherent disadvantages, such as:

a. they do not have an integrated command, control, monitoring and signaling system;
b. they are not easily portable;
c. they are not foldable;
d. they have complicated driven wheel systems;
e. they are not reliable, and are heavy;
f. they have braking systems with complicated mechanics; and
g. they do not have electric regenerative braking systems.

SUMMARY OF THE INVENTION

The above technical problems of personal transports, along with other deficiencies in the prior art, are solved by the present invention, which is directed to a foldable and portable electric vehicle which includes an integrated command, control, monitoring and signaling system, is reduced in size in the folded position for easy portabililty, is reduced in overall weight by an innovative design, and is configured to produce and store energy as well as reduce energy consumption during regular operation.

A preferred embodiment of the present invention is directed to an electric transport that includes the following features:

(i) a folding chassis, including a support plate for supporting a person during transport, a folding system for the support plate and a steering column, a rear wheel, a suspension system for the rear wheel, a front driving (drive) wheel, a suspension system for the front drive wheel, a chamber for an accumulator, a compartment for the controller, and a mechanical brake on the rear wheel;

(ii) foldable handlebars each comprising a planar rotation body around another pin, a sliding handlebar on both planar rotation bodies, a rubber sleeve and a release bolt; and (iii) an integrated system of command, control, monitoring and signalization comprising a display control unit mounted within a housing with an acceleration throttle, a braking throttle, on/off button, a headlight button, a clock setting button, and attached to the front of the personal transport, a headlight with low energy consumption and a horn.

The control unit is connected with the main board that has a microcontroller, sensors and a power circuit that carries power to the brushless DC electric motor from an accumulator during acceleration. During braking operation, the same motor works as a generator, and the kinetic energy is sent to the accumulator.

A preferred operating method of an electric vehicle according to the present invention is based on an integrated system of command, control, monitoring and signaling of the present invention according to the following steps.

Step 1
Start power of the integrated system of command, control, monitoring and signaling.
Step 2
Read the state of the hard equipment that is indicated in the display.
Step 3
If the hard equipment works, then go to step 4.
If the hard equipment does not work, then an error is displayed.
Step 4
Read the battery charge, current speed, time, etc. indicated in the display.
Step 5
Click acceleration throttle.
Step 6
If the vehicle starts, then go to step 7.
If the vehicle does not start, then an error is displayed.
Step 7
If an increase in speed is needed, then go to step 5.
If braking is required, then go to step 8.
Step 8
Click brake throttle.
Step 9
If a stop is needed, then go to step 10.
If acceleration is required, then go to step 5.
Step 10
Continue braking power.
Step 11
If an emergency stop is needed, then go to step 12.
If an emergency stop is not required, then go to step 10.
Step 12
Emergency brake.
Step 13
Stop the vehicle.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, with reference to the noted plurality of drawings by way of non-limiting examples of embodiments of the present invention, in which like reference numerals represent similar parts throughout the several views of the drawings, and wherein.

DETAILED DESCRIPTION OF THE PRESENT INVENTION

Figure 1:
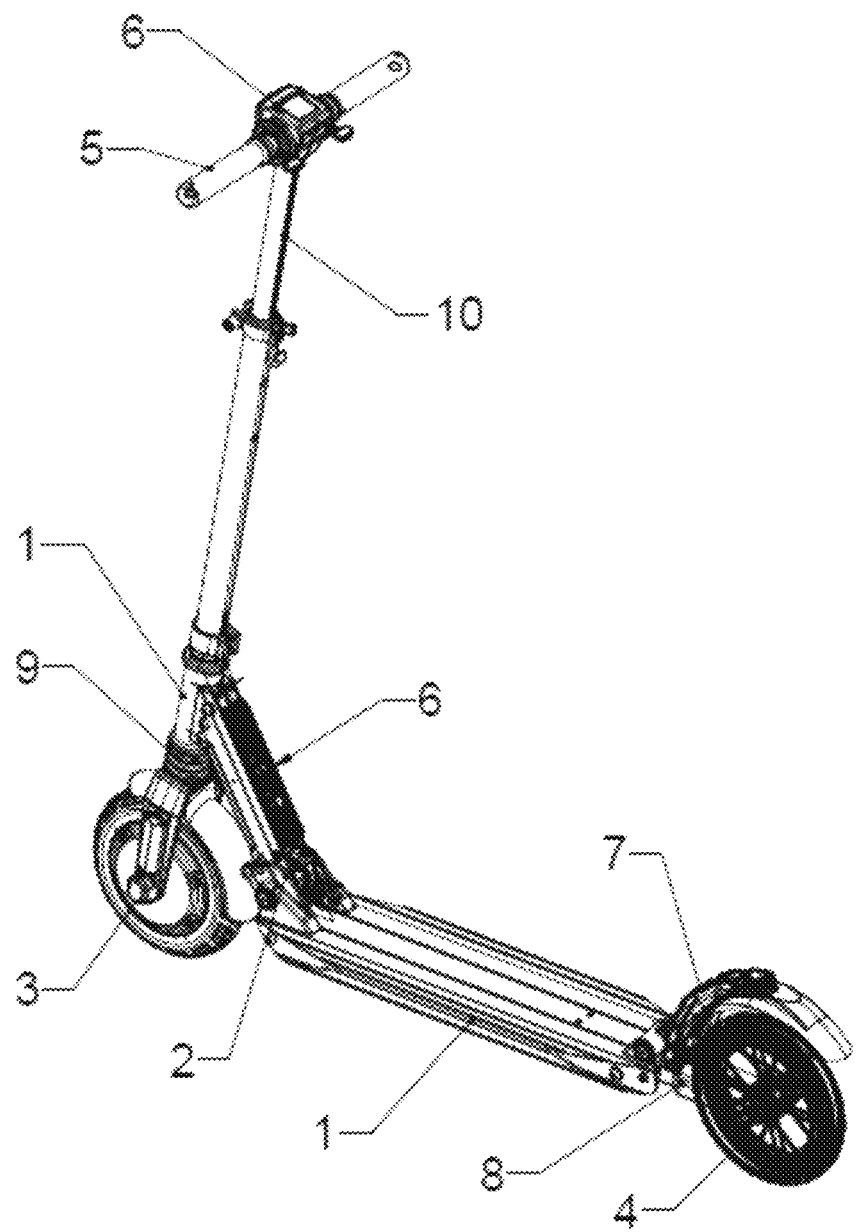
FIG. 1 shows in perspective view a portable electric vehicle, which includes an integrated system of command, control, monitoring and signaling, according to the present invention.

As shown in FIG. 1, the foldable and portable electric vehicle of the present invention includes a chassis 1 comprising a support plate for supporting a person during operation and a steering column connection, a steering column 10 with handlebars 5 at the top, a front wheel 3 with suspension 9 and a rear wheel 4 with suspension 8 and a mechanical brake assembly 7. An integrated system 6 for command, control, monitoring and signaling is mounted inside a housing on top of steering column 10.

Figure 2:
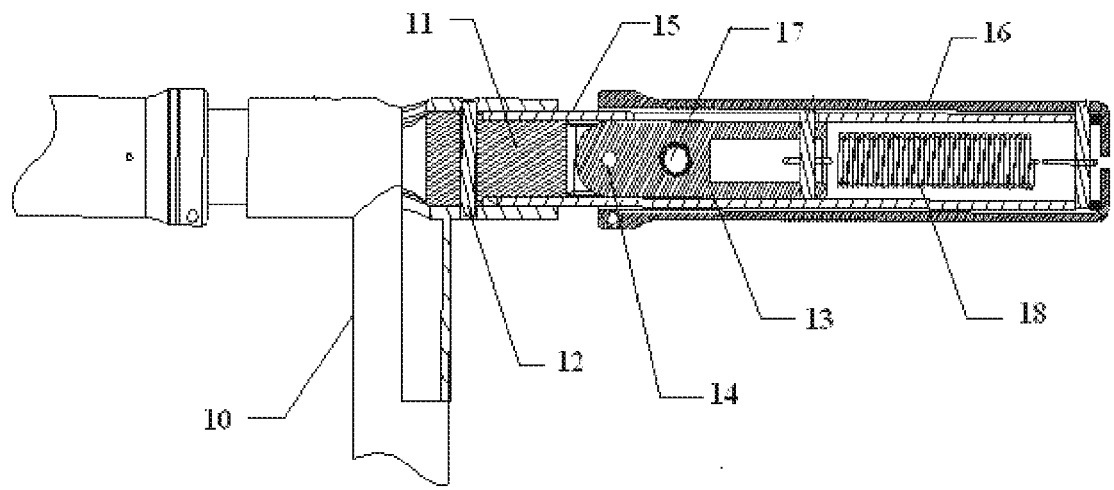
FIG. 2 shows a foldable handlebar that provides electric vehicle size reduction for storage or transport.

As can best be seen in FIG. 2, the foldable handlebar is made from a planar rotation body 11 fixed to steering column 10 via pin 12, with a planar rotation body 13 around the pin 14. The handlebar pipe 15 on the planar rotation body 11 and the planar rotation body 13 is equipped with a rubber sleeve 16. Folding of the handlebar 5 is performed by pressing a release bolt 17, followed by sliding of the handlebar pipe 15 outwardly of torsion spring 18 and the rotation on the vertical plane of the foldable handlebar with a 90° angle, until the stability is ensured in the folded position.

Figure 3:
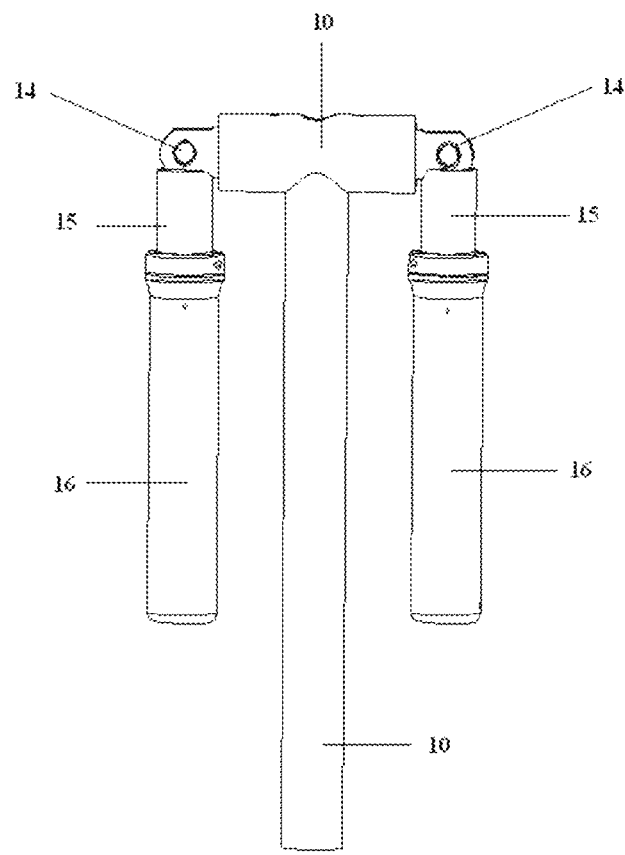
FIG. 3 shows a handlebar 5 in the folded state.

As best seen in FIG. 3, foldable handlebars 5, fitted with rubber sleeves 16, are parallel to the steering column 10 in the folded position.

Figure 4:
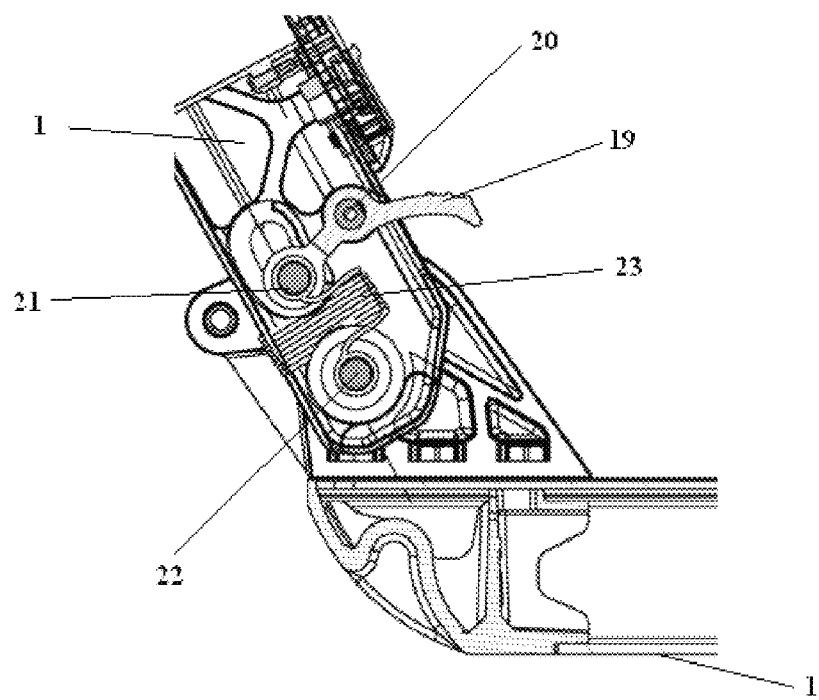
FIG. 4 shows the folding system 2 that is used for unlocking in a way to fold the two components of the electric vehicle chassis 1.
Figure 5:
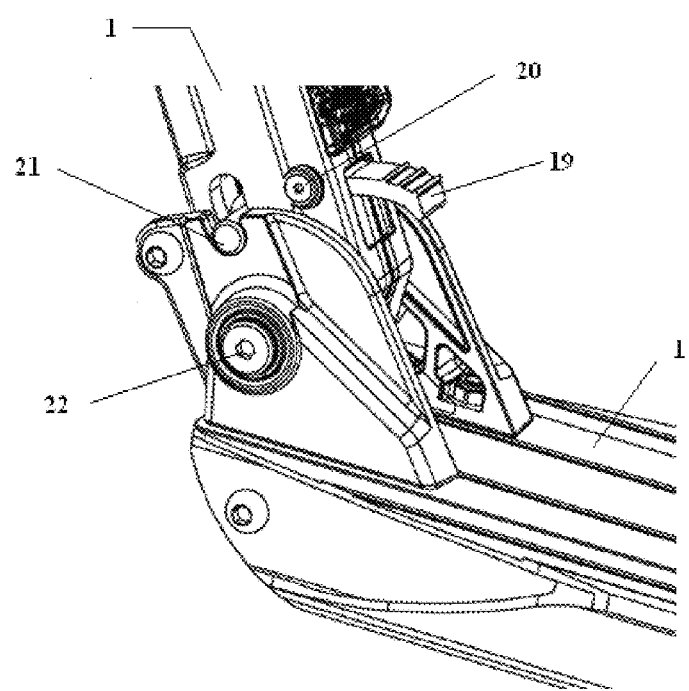
FIG. 5 shows a layout of the system 2 used for unlocking in order to fold the two components of the electric vehicle chassis 1.
Figure 6:
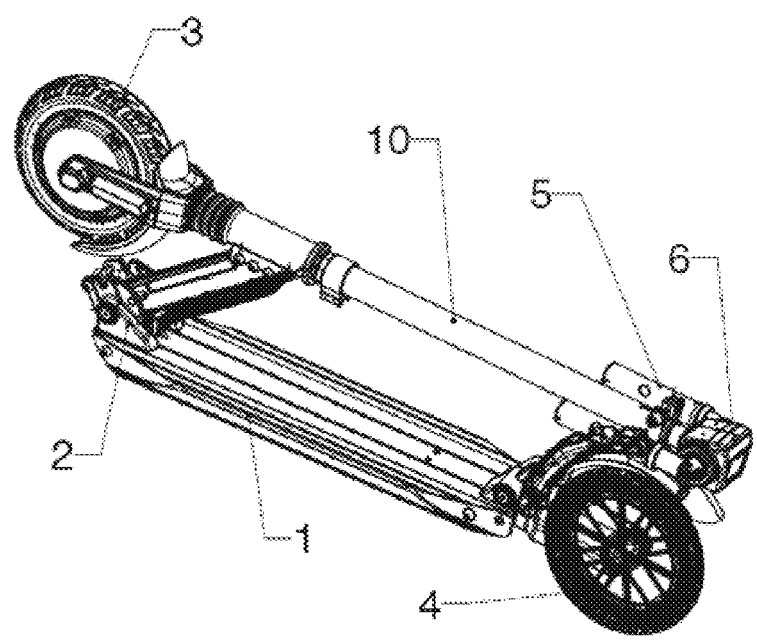
FIG. 6 shows a foldable and portable electric vehicle with integrated command control, monitoring and signaling system for transport of one person, in a folded position.

As best seen in FIGS. 4 and 5, the folding system 2 operates by turning bolt lever 19 around bolt 20 to train bolt 21 that unlocks the two components of chassis 1, which can then be rotated around connection 22 to achieve folding of the chassis. In preparation for the restoration of the vehicle position by unfolding, the system 2 is provided with a traction spring 23 (FIG. 3) which provides the position of the bolt 21 by blocking chassis 1.

Figure 7:
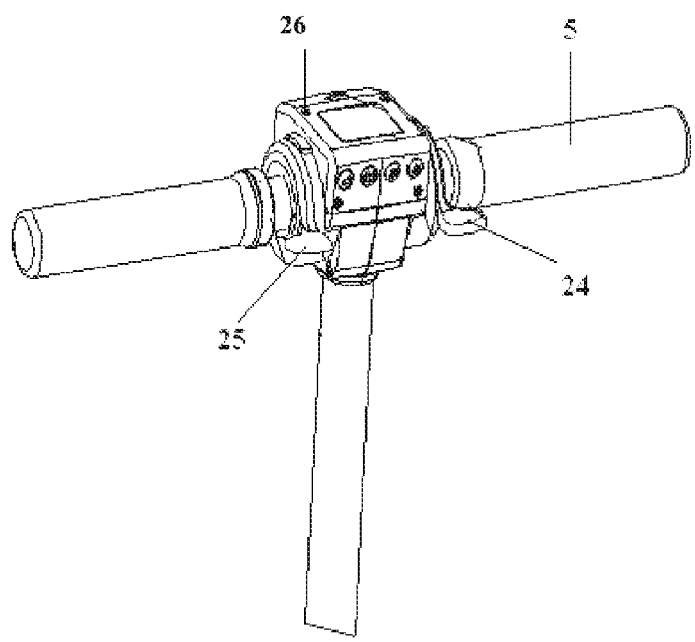
FIG. 7 presents an integrated system of command, control, monitoring and signalization.

FIG. 7 shows the integrated system of command, control, monitoring and signalization 6 comprising an acceleration unit 24, a braking unit 25, a sealed chamber 26, a horn, a control unit, electronic components mounted on a main board, a display unit, accumulator and a controller.

Figure 8:
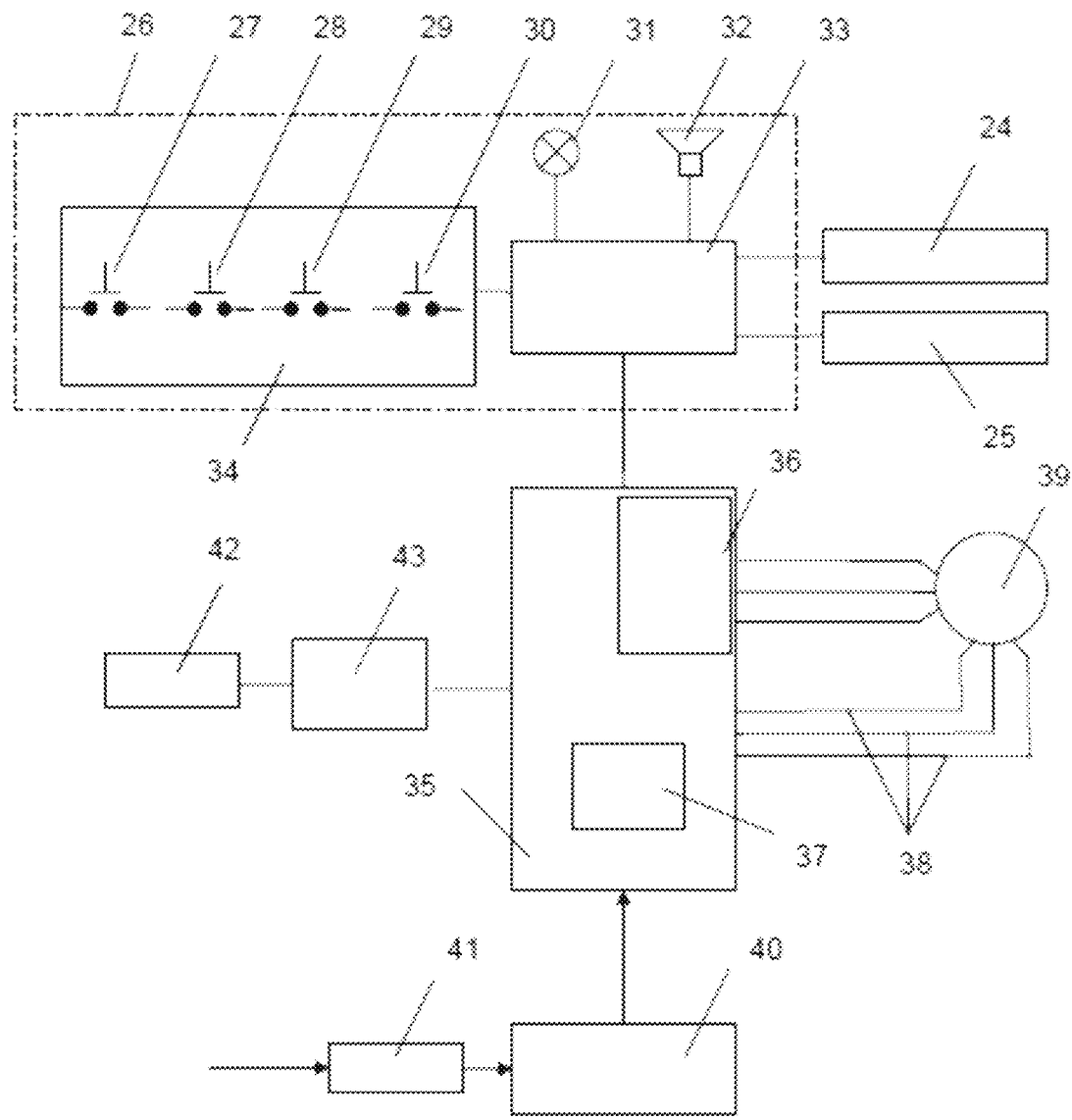
FIG. 8 shows the integrated command control, monitoring and signalization system.

FIG. 8 is a schematic of the integrated system of command, control, monitoring and signalization 6. The display control unit 33 is mounted in a housing 26, with an acceleration throttle 24, a braking throttle 25, an IC board 34 that supports an on/off button 27, the headlight button 28, a button 29 for the horn, a clock setting button 30, a headlight 31 with low energy consumption, a horn 32, a control unit 42, 43 that is connected to a main board 35 with microcontroller 37, sensor 38 and a power circuit 36 that carries power to the brushless DC electric motor 39 from an accumulator 40 during acceleration mode, and during braking operation the same motor works as generator, so power 41 also is sent to charge the accumulator.

Figure 9:
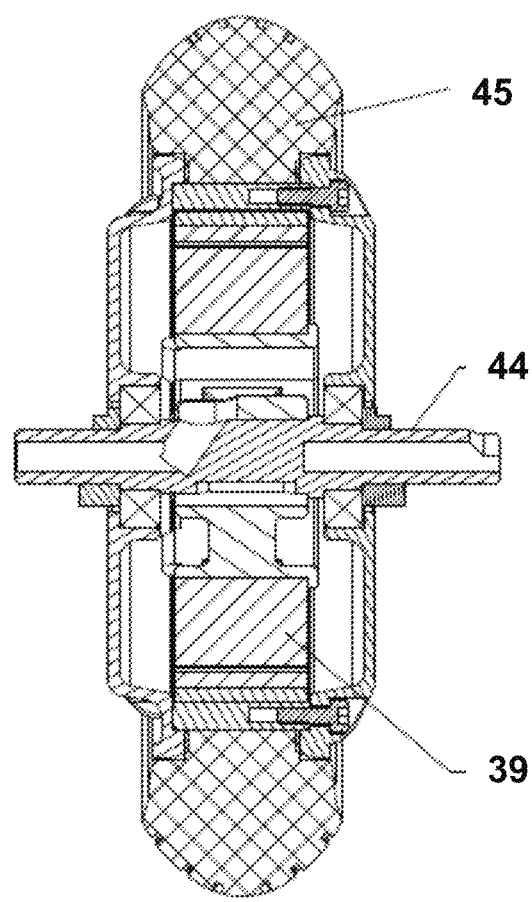
FIG. 9 shows a driving (drive) wheel for operating the vehicle during acceleration, or braking during deceleration.

As seen best in FIG. 9, the front wheel is built as a brushless DC electric machine whose tubular shaft 44 is fixed on the vehicle chassis 1. The electric machine 39 works as a brushless DC electric motor during acceleration, or as a generator during deceleration. The electric machine is fitted with a rubber tire 45.

One embodiment of the present invention is directed to an electric vehicle for transporting a person, including a chassis; a folding system for the chassis; a front drive wheel, a rear wheel including an appropriate tire, foldable handlebars; an integrated command control, monitoring and signaling system; a mechanical brake located on the rear wheel; a rear wheel suspension for the rear wheel of the vehicle; a front wheel suspension for the front wheel of the vehicle; and a steering column for the vehicle.

According to another aspect of the invention, vehicle dimensions are reduced for storage or transport by having each of the handlebars include a first planar rotation body fixed to the steering column by a first slidably mounted pin; a second planar rotation body around the second pin, a handlebar pipe being slidably mounted on the first planar rotation body and on the second planar rotation body and being provided with a rubber sleeve so that when a release bolt is pushed, there is allowance for the handlebar pipe to slide outwardly in the direction of a tensioning spring and, turning the handlebar vertically at an angle of 90°, to ensure stability of the handlebars in the folded position.

According to yet another aspect of the invention, a folding system 2 of chassis 1 includes a lever which rotates around the first bolt to train a third bolt under the action of a traction spring, unlocking the two components of the chassis that can be rotated to achieve its folding, whereby vehicle dimensions are reduced for storage or transport.

Further yet, in a first stage of a folding process, folding is initiated. In a second stage of the folding process, the handlebars are folded. In a third stage, the chassis is folded, and the folding process is completed in a fourth stage.

According to the invention, the integrated command control, monitoring and signaling system increases electric vehicle reliability by way of a display control unit mounted in a housing with an acceleration throttle, a braking throttle, a board containing an on/off button, a button for a light, a button for setting a clock, a headlight with low power consumption, a horn, a button for the horn, and a control unit which communicates with a main board that contains a microcontroller, sensors and a power circuit for supplying power to a DC brushless motor from an accumulator when the electric vehicle is accelerating or, when the electric vehicle is braking, the same motor working as a generator, whereby power is sent to charge the accumulator.

Furthermore, the driving wheel is built like a brushless electric machine that operates as a DC electric motor during acceleration, or as an electric generator during deceleration, and a tubular shaft is fixed to the chassis and the outside of the shaft is fitted with a rubber tire.

According to another aspect of the invention, a method for operating an electric vehicle according to the present invention comprises in a first stage, initiating the process, in a second stage, reading the status of the hard equipment, in a third stage, checking the status of the equipment, in a fourth stage, displaying the battery charging status and current speed and time, in a fifth stage, pressing the acceleration throttle, in a sixth stage, checking for vehicle starting, in a seventh stage, checking the braking throttle, in an eighth stage, pressing the brake throttle, in a ninth stage, checking for a stopped vehicle, in a tenth stage, continuing braking, in an eleventh stage, checking for an emergency stop, in a twelfth stage, pushing the emergency brake, and in a thirteenth stage, stopping the electric vehicle.

According to yet another aspect of the invention, the electric vehicle of the present invention comprises a folding chassis with a support plate, a folding system for the chassis, a front driving wheel with a tubular shaft fixed to the chassis and which is fitted with a rubber tire, the front driving wheel operating as a brushless DC electric motor during an acceleration operation or as a generator during a deceleration operation, a rear wheel, a foldable handlebar, an integrated command, control, monitoring and signaling system, a mechanical brake on the rear wheel, a rear wheel suspension, a front wheel suspension, and a steering column. The vehicle provides an integrated command control, monitoring and signaling system to increase electric vehicle reliability which includes a display control unit mounted in a housing with an acceleration throttle, a braking throttle, a board containing an on/off button, a button for lights, a horn, a button for a horn, a button for setting a clock, a headlight with low power consumption, and a control unit which communicates with a main board that contains a microcontroller, sensors and a power circuit for supplying power from an accumulator to the front wheel. There is further included a DC brushless motor when the electric vehicle is accelerating, or during a braking operation, the same motor works as a generator, and power is sent to charge the accumulator.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is noted that the foregoing examples have been provided merely for the purpose of explanation and are in no way to be construed as limiting of the present invention.

While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A foldable and portable electric vehicle comprising:
   a folding chassis with a support plate;
   a folding system for the chassis;
   a driving wheel in the front of the vehicle;
   a rear wheel in the rear of the vehicle;
   foldable handlebars;
   an integrated command, control, monitoring and signaling system;
   a mechanical brake on the rear wheel;
   a rear wheel suspension for the rear wheel of the vehicle;
   a front wheel suspension for the front wheel of the vehicle; and
   a steering column for the vehicle.

2. A foldable and portable electric vehicle according to claim 1 wherein vehicle dimensions are reduced for storage or transport by having each of the handlebars comprise:
   a first planar rotation body fixed to the steering column by a first pin;
   a second planar rotation body around a second pin; and
   a handlebar pipe being slidably mounted on the first planar rotation body and on the second planar rotation body and being provided with a rubber sleeve so that when a release bolt is pushed, there is allowance for the handlebar pipe to slide outwardly in the direction of a tensioning spring and turning the handlebar vertically at an angle of 90° to ensure stability of the handlebars in the folded position.

3. A foldable and portable electric vehicle according to claim 2, wherein the folding system of the chassis comprises a lever which rotates around a second bolt to train a third bolt under the action of a traction spring, unlocking two components of the folding chassis that can be rotated to achieve its folding, whereby vehicle dimensions are reduced for storage or transport.

4. A foldable and portable electric vehicle according to claim 3, wherein folding is initiated in a first stage of a folding process, the handlebars are folded in a second stage, the chassis is folded in a third stage, and the folding process is ended in a fourth stage.

5. A foldable and portable electric vehicle according to claim 2, wherein folding is initiated in a first stage of a folding process, the handlebars are folded in a second stage, the chassis is folded in a third stage, and the folding process is ended in a fourth stage, and wherein said vehicle further comprises a power circuit for supplying power to a DC brushless motor from an accumulator when the electric vehicle is accelerating or when the electric vehicle is braking, with the same motor working as a generator, and power is sent to charge the accumulator.

6. A foldable and portable electric vehicle according to claim 2, wherein folding is initiated in a first stage of a folding process, the handlebars are folded in a second stage, the chassis is folded in a third stage, and the folding process is ended in a fourth stage.

7. A foldable and portable electric vehicle according to claim 1, wherein folding is initiated in a first stage of a folding process, the handlebars are folded in a second stage, the chassis is folded in a third stage, and the folding process is ended in a fourth stage.

8. A foldable and portable electric vehicle according to claim 7, wherein the driving wheel works as a brushless electric machine that operates as a DC electric motor during acceleration or as an electric generator during deceleration and whose tubular shaft is fixed to the chassis and whose outside is fitted with a rubber tire.

9. A foldable and portable electric vehicle according to claim 1, wherein the driving wheel works as a brushless electric machine that operates as a DC electric motor during acceleration or as an electric generator during deceleration, and whose tubular shaft is fixed to the chassis and whose outside is fitted with a rubber tire.

10. A method for operating a foldable and portable electric vehicle according to claim 1, wherein the method comprises in a first stage, initiating a process, in a second stage, reading the status of hard equipment, in a third stage, checking the status of the hard equipment, in a fourth stage, displaying battery charging status and current speed and time, in a fifth stage, pressing an acceleration throttle, in a sixth stage, checking vehicle starting, in a seventh stage, checking for need of a braking throttle, in an eighth stage, pressing a brake throttle, in a ninth stage, checking for a stopped vehicle, in a tenth stage, continuing braking, in an eleventh stage, checking for an emergency stop, in a twelfth stage, pushing an emergency brake, and in a thirteenth stage, stopping the electric vehicle.

11. A foldable and portable electric vehicle according to claim 1, wherein the foldable and portable electric vehicle provides integrated command, control, monitoring and signaling.

12. A foldable and portable electric vehicle according to claim 1, wherein the integrated command, control, monitoring and signaling system further comprises a display control unit mounted in a housing with an acceleration throttle, a braking throttle, a board containing an on/off button, a button for lights, a button for setting a clock, a headlight with low power consumption, a horn, a button for the horn, and a control unit which communicates with a main board that contains a microcontroller, sensors and a power circuit for supplying power to a DC brushless motor from an accumulator when the electric vehicle is accelerating or when the electric vehicle is braking, the same motor working as a generator, whereby power is sent to charge the accumulator.

13. A foldable and portable electric vehicle comprising:
a folding chassis with a support plate;
a driving wheel in front of the vehicle, wherein the driving wheel works as a brushless electric machine that operates as a DC electric motor during acceleration or as an electric generator during deceleration, and whose tubular shaft is fixed to the chassis and whose outside is fitted with a rubber tire;
a rear wheel in the rear of the vehicle;
an integrated command, control, monitoring and signaling system which includes a display control unit mounted in a housing with an acceleration throttle, a braking throttle, a board containing an on/off button, a button for lights, a horn, a button for the horn, a button for setting a clock, a headlight with low power consumption, a control unit which communicates with a main board that contains a microcontroller, sensors and a power circuit for supplying power to the DC brushless motor from an accumulator when the electric vehicle is accelerating or during the braking operation, the same motor working as a generator, and power is sent to charge the accumulator;
a mechanical brake on the rear wheel;
a rear wheel suspension for the rear wheel of the vehicle;
a front wheel suspension for the front wheel of the vehicle;
a steering column;
foldable handlebars, wherein vehicle dimensions are reduced for storage or transport, each foldable handlebar comprising:
a first planar rotation body fixed to the steering column by a first pin; and
a second planar rotation body around a second pin;
a handlebar pipe being slidably mounted on the first planar rotation body and on the second planar rotation body and being provided with a rubber sleeve so that when a release bolt is pushed, there is allowance for the handlebar pipe to slide outwardly in the direction of a tensioning spring and turning the handlebar vertically at an angle of 90° to ensure stability of the handlebar in the folded position; and
a folding system for the chassis, wherein the folding system of the chassis comprises a lever which rotates around a second bolt to train a third bolt under the action of a traction spring, unlocking two components of the folding chassis that can be rotated to achieve its folding, whereby vehicle dimensions are reduced for storage or transport, and wherein folding is initiated in a first stage of a folding process, the handlebars are folded in a second stage, the chassis is folded in a third stage, and the folding process is completed in a fourth stage.

* * * * *